June 2, 1953  R. C. BAKER ET AL  2,640,547
GAS-OPERATED WELL APPARATUS
Filed Jan. 12, 1948  5 Sheets-Sheet 1

INVENTORS
REUBEN C. BAKER
THOMAS M. RAGAN

BY
Oscar A. Mellin
ATTORNEY.

June 2, 1953     R. C. BAKER ET AL     2,640,547
GAS-OPERATED WELL APPARATUS
Filed Jan. 12, 1948     5 Sheets-Sheet 3

INVENTORS.
REUBEN C. BAKER
THOMAS M. RAGAN
BY
Oscar A. Mellin
ATTORNEY.

June 2, 1953 R. C. BAKER ET AL 2,640,547
GAS-OPERATED WELL APPARATUS
Filed Jan. 12, 1948 5 Sheets-Sheet 5

INVENTORS.
REUBEN. C. BAKER
THOMAS M. RAGAN

BY
Oscar A. Mellin
ATTORNEY.

Patented June 2, 1953

2,640,547

UNITED STATES PATENT OFFICE 2,640,547

GAS-OPERATED WELL APPARATUS

Reuben C. Baker, Coalinga, and Thomas M. Ragan, Downey, Calif., assignors to Baker Oil Tools, Inc., Vernon, Calif., a corporation of California Application January 12, 1948, Serial No. 1,845

16 Claims. (Cl. 166—12)

This invention pertains to well devices, and more particularly to subsurface devices or apparatus useful in bore holes, such as oil, gas and similar wells.

It has been proposed heretofore to run various well devices in a well bore or well casing on a running-in string and operate the devices by instrumentalities acting suddenly or violently. These instrumentalities include explosives, highly stressed springs and the hydrostatic head of fluid in the well bore. As a result of their substantially instantaneous action, these instrumentalities impose undesired shock loads, strains and distortions on the equipment, oftentimes resulting in its ineffective or faulty operation. In some instances, the equipment itself is damaged or destroyed.

Accordingly, it is an object of the present invention to overcome the aforenoted undesired features by providing a device which is capable of operating the well apparatus by the application of forces which increase comparatively gradually in intensity.

Certain subsurface well apparatus, such as a well packer, are anchored to a well casing through subjecting the packer to well defined sequences of operation. The employment of the aforenoted relatively instantaneous forces may not allow the desired operational sequences to occur. It is, therefore, another object of the invention to provide a device in which a motive force gradually increases in intensity over a period of time for appropriately operating or setting the well apparatus to insure functioning of these parts in proper sequence.

A further object of the invention is to provide a device, in which products of combustion are utilized for gradually developing an increasing force for appropriately operating or setting the well apparatus.

Another object of the invention is to insure better and more efficient burning of a combustible charge in a subsurface setting or operating tool.

Still a further object of the invention is to provide a subsurface setting or operating tool for well apparatus, capable of effectively using a comparatively inexpensive fuel in developing high pressures within the tool.

Another object of the invention is to provide improved subsurface setting or operating tools for well apparatus, which utilize relatively slow burning combustible materials for gradually generating comparatively high pressures.

In the use of a setting or similar tool in operating well apparatus within a well bore, the operating force developed in the tool is opposed ordinarily by the hydrostatic head of fluid in the well bore. A further object of the invention is to substantially minimize the effect of such hydrostatic head in counteracting the operating force in the setting tool.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figures 1a and 1b together constitute an elevational view of a well apparatus positioned in a well casing, Fig. 1b forming a lower continuation of Fig. 1a;

Figs. 2a, 2b and 2c together constitute an enlarged longitudinal section through the apparatus illustrated in Fig. 1a and 1b, with the parts in position for moving the apparatus lengthwise through the casing, Fig. 2c forming a lower continuation of Fig. 2b, and Fig. 2b forming a lower continuation of Fig. 2a;

Figs. 3a and 3b are views similar to Figs. 2a and 2c of most of the apparatus, with some of the parts actuated and in a different operative position;

Fig. 5 is an enlarged longitudinal section through the firing pin portion of the device prior to firing of the explosive;

Fig. 6 is a view similar to Fig. 5 of the firing pin portion after firing of the device;

Figs. 7 and 8 are cross-sections taken along the lines 7—7 and 8—8, respectively, on Fig. 2a;

Figs. 9 and 10 are cross-sections taken along the lines 9—9 and 10—10, respectively, on Fig. 2b;

In the forms of the invention disclosed in Figs. 1 to 15, inclusive, it is desired to run a well packer A to a desired location in a well casing B disposed within a bore hole. The packer is then anchored in packed off condition against the well casing through use of a setting tool C connected to it, which is attached to the lower end of a running-in string, such as a wire line D extending to the top of the well bore. If desired, a sinker bar or jarring device E may be interposed between the wire line D and setting tool C.

The well packer A may assume any desired form. The packer disclosed in the drawings includes a tubular main body 10 whose central passage 11 may be closed by a plug 12. A guide 13 is secured to the lower end of the body to prevent hanging up of the tool in the casing joints or coupling spaces during its lowering through the well casing B.

The well packer can be anchored against downward movement in the well casing by a plurality of lower segmental slips 14, whose lower ends engage the guide 13 and a lower abutment or flange 15 on the body. The inner surfaces 16 of these slips are tapered in a downward and inward direction for slideable engagement with a corresponding externally tapered surface 17 on a frusto-conical expander 18 slideable on the body. This expander is connected to the lower end of a packing sleeve 19 of rubber or similar material disposed around the body 10, the upper end of this packing sleeve being connected to an upper expander 20 having an upward and inwardly inclined externally tapered surface 21 engageable with corresponding tapered surfaces 22 on a plurality of upper segmental slips 23.

Initially, the slips 14, 23 and packing element 19 are retained in retracted positions with respect to the packer body 10. Shear screws 24, 25, or other suitable frangible connecting elements, secure the upper and lower conical expanders 20, 18 to the body, with the intervening packing sleeve 19 held in retracted position. The upper and lower slips 23, 14 are also held in retracted positions by shear screws 26, 27 attaching them to their associated upper and lower expanders 20, 18.

The shear screws 26, attaching the upper slips 23 to the upper expander 20, have a combined shearing strength which is substantially less than the shear value of the screws 24 holding the upper expander to the body 10. These latter screws have a lesser shear value than the screws 25, 27 securing the lower expander 18 to the body and the lower slips 14 to the lower expander. These relative shear values are selected to secure detachment first of the upper slips 23 from the upper expander 20 and movement of the upper slips downwardly along the upper expander and radially outward into anchoring engagement with the casing wall (Fig. 3b). Subsequent upward strain or pull on the packer body 10 then shears the screws 24 holding the upper expander 20 to the body 10, and moves the lower expander 18 and slips 14 with the body toward the upper expander 20 and slips 23, effecting compression of the packing 19 between the expanders and its outward expansion into firm sealing engagement with the wall of the casing. Thereafter, an increase in the upward pull or force on the packer body 10 substantially simultaneously shears the screws 25, 27 holding the lower expander 18 to the body and the lower slips 14 to the lower expander, to cause the lower flange 15 and guide 13 on the body to shift the lower slips 14 upwardly along the lower expander and radially outward into anchoring engagement with the wall of the casing B. A split, contractile ring 28 may be disposed in the upper expander for engagement with one of several circular ratchet teeth 29 formed on the exterior of the body 10, to lock the latter against downward movement (Fig. 4b).

Figures 4A, 4B:
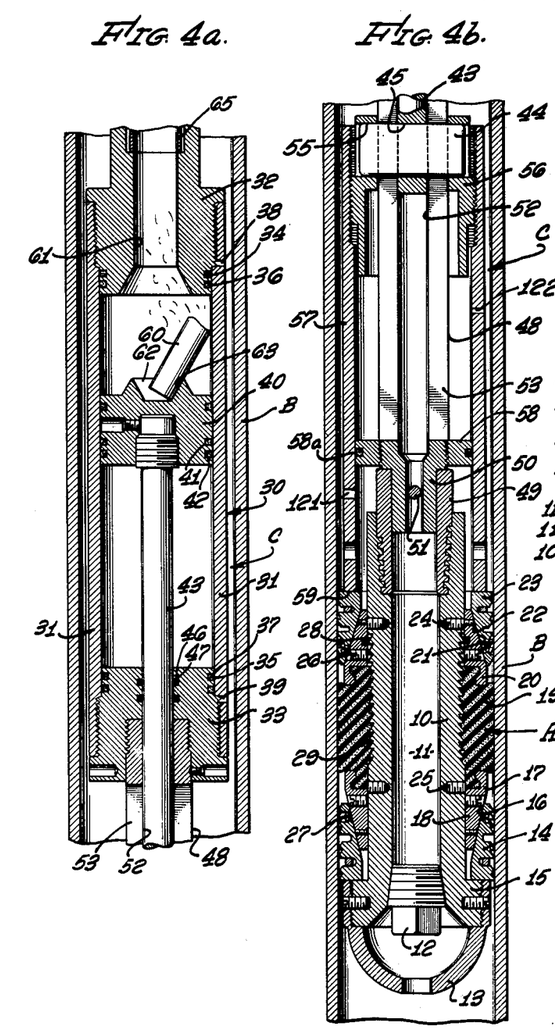
Figs. 4a and 4b are views similar to Figs. 3a and 3b, with the parts in still a different actuated and operative position.
Figure 11:
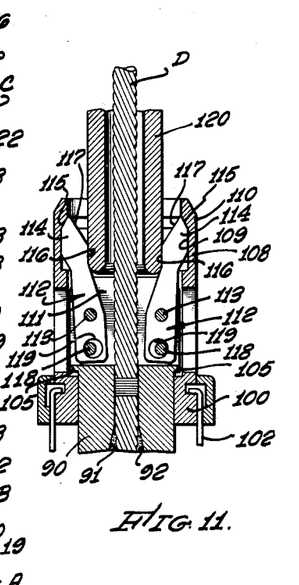
Fig. 11 is a partial longitudinal section through the upper latch portion of the apparatus, which enables its withdrawal from the well casing prior to operation of the apparatus.

It is apparent from a consideration of Fig. 4b that the annular space between the body 10 and casing wall has been sealed off by the packing sleeve 19, that upward movement of the packer A within the casing B is prevented by the upper expander 20 and slips 23, and that downward movement is prevented by the lower expander 18 and slips 14. It will also be evident that the full setting of the packer in the well casing has occurred as a result of a definite sequence of steps. These are the outward movement of the upper slips 23 to casing engaging position, the expansion of the packing element 19 against the casing, and the subsequent engagement of the lower slips 14 with the casing. A definite time interval should be provided between these main operational steps to insure proper setting of the packer in the well casing. In the present instance, it is desired to provide for such operational sequence by the use of a force developed by products of combustion within the setting tool C connected to the well packer A, in order to enable the well packer to be run in the casing on a wire line D.

As disclosed in the drawings (Fig. 2b, for example), a gas pressure is developed within a cylinder 30, consisting of a generally cylindrical sleeve 31, an upper head 32 threaded into the sleeve and a lower head 33 threaded into the sleeve. Leakage from the cylinder through the threaded connections may be prevented by suitable side seals 34, 35 in peripheral grooves 36, 37 in the heads engaging the inner wall of the cylinder sleeve 31. Upper and lower vent holes 38, 39 may also be provided through the sleeve between the seals 34, 35 and threaded connections, for a purpose to be described below.

A piston 40 is slideably mounted in the cylinder 30. This piston has one or more ring grooves 41 in its periphery for the accommodation of seal rings 42 to prevent leakage between the piston and cylinder. As disclosed, these rings 42 may consist of rubber of round cross-section to guard against leakage in either direction. The upper end of a piston rod 43 is threadedly connected to the piston, the rod extending downwardly through the lower cylinder head 33 to a point therebelow, where an anvil or cross-piece 44 is mounted within a transverse slot 45 in the rod. Leakage between the rod 43 and lower cylinder head 33 is prevented by suitable rod packing in the form of one or more round rubber or rubber-like seals 46 engaging the periphery of the rod and disposed within suitable ring grooves 47 in the head.

It is desired to transfer the downward movement or force of the piston 40 and piston rod 43 to the upper slips 23 of the packer, and the relative upper movement of the cylinder 30 to the packer body 10 in order to obtain the desired anchoring of the packer in the well casing. To accomplish this purpose, a tubular actuating mandrel 48 is threadedly connected to the lower end of the lower cylinder head 33. The lower end 50 of the mandrel is secured to a sleeve 49, threaded into the upper end of the body 10, through the agency of a frangible pin 51. As specifically disclosed, the lower end of the mandrel is of reduced diameter and is piloted within the sleeve 49, the pin extending transversely through the sleeve 49 and piloted mandrel portion 50.

The piston rod 43 is movable downwardly within the bore 52 of the actuating mandrel 48, the cross-piece 44 projecting in opposite directions from the rod through diametrically opposed longitudinally extending slots 53 formed through the mandrel wall. The cross-piece also extends into opposed slots 55 formed through a setting ring or sleeve 56 slideably mounted on the actuating mandrel 48, to form a connection between the piston rod 43 and the setting ring 56. A setting sleeve or skirt 57 is adjustably threaded on the setting ring, this skirt depending from the ring and being slideable along a flange or head 58 threaded on the lower end of the actuating mandrel 48. Leakage around the head is prevented by a suitable seal ring 58a mounted on it and engaging the sleeve 57. This sleeve 57 extends beyond the head 58 and may be rotated or threaded on the setting ring to engage its lower end 59 with the tops of the upper slips 23.

A fluid or gaseous force is developed within the cylinder 30 above the piston 40, this force moving the piston and piston rod 43 downwardly and the cylinder 30 relatively upwardly. The downward movement of the rod 43 is transmitted to the setting sleeve or skirt 57 through the anvil 44 and setting ring 56, while the upward movement of the cylinder 30 is transmitted to the packer body 10 through the actuating mandrel 48, frangible pin 51 and sleeve 49. Accordingly, it is apparent that the development of sufficient pressure in the cylinder 30 will eventually shear the screws 26 holding the upper slips 23 to the expander 20, and move the slips outwardly against the casing B, whereupon the cylinder 30 will move upwardly to pull the body 10 in the same direction to expand the packing sleeve 19 against the casing B, and then the lower slips 14 against the casing.

In order to obtain the desired operational sequence, a combustible fuel is contained within the upper end of the cylinder 30. This fuel has a slow burning rate and may require several seconds after its ignition to develop sufficient gaseous pressure for fully setting the well packer A, and for applying sufficient upward force on the cylinder to shear the frangible pin 51 attaching the setting tool C to the well packer, for the purpose of removing the setting tool from the well bore. One form of fuel actually used in the cylinder requires from 8 to 12 seconds to develop gradually a sufficiently high pressure to fully set the well packer A and shear the pin 51, assuming that about 25,000 pounds total force is required to disrupt the pin. This is to be distinguished from the use of an explosive, whose full pressure and expansion force is developed and applied instantaneously.

It has been found that a railway or highway flare will develop relatively high gas pressures of sufficient extent to perform the desired functions in the apparatus described. Certain rocket fuels may also be employed, so long as they are relatively slow burning, as distinguished from an explosive. In general, the combustible material employed should contain its own source of oxygen. It is evident that a wide variety of products can be used for the combustion material. A few examples of the analyses of such materials follow:

*Example 1*

| | Per cent |
|---|---|
| Strontium nitrate | 68.3 |
| Sulfur | 13 |
| Wood flour | 0.5 |
| Potassium perchlorate | 7.8 |
| Sawdust | 10.4 |

This type of product is used in highway flares and railway flares. It can be varied in its nitrate combustion by replacing the strontium nitrate quantities with equivalent quantities of other nitrates. The wood flour and sawdust can be varied in their ratios, and, to some extent, the sulphur can be replaced by wood flour. These variations can be used to control the burning rates of the charge.

*Example 2*

A fuel may consist essentially of 75% potassium perchlorate with 25% asphalt, the asphalt being chosen to give a melting point that is desirable from the standpoint of stability at various temperatures. The potassium perchlorate can be replaced by equivalent amounts of ammonium perchlorate, in order to allow control of the burning rate of the product.

A fuel may also have the following analysis:

*Example 3*

| | Per cent |
|---|---|
| Barium nitrate | 42.5 |
| Metallic magnesium (grained) | 45 |
| Powdered aluminum | 10 |
| Linseed oil | 2.5 |

The magnesium is preferably coated with linseed oil before mixing to prevent its oxidization in storage.

In order to facilitate ignition of the above materials, an igniter is usually applied to it. This igniter can be made of black powder mixed with organic material to reduce its combustion rate. As an example, the igniter may consist of a mixture of 75% black powder and 25% of the materials set forth above in Example 3.

The above formulae are variable in their combustion rates, which allows control of the rate of development of pressure in the cylinder 30. Further control of its rate can be obtained through modifications in the shape of the material or charge. Control may be provided by covering the charge so that only one end is exposed to the combustion, thus forcing the combustion or burning to progress along the length of the charge. The sides of the charge can be protected by wrapping it with asbestos paper that has been dipped in a solution of sodium silicate, the latter acting as a binder. Good results are also achieved through the use of glass cloth wrappings on the charge, again using a sodium silicate solution as the binder.

In actual use, the usual railroad or highway flare provides very good results. These flares have the advantage of being very inexpensive. In general, the combustion material used can vary from the ones specified above so long as they include oxygen containing compounds and other combustible materials mixed in such ratios as to give controlled physical properties and controlled burning rates.

The combustion charge, such as a railway flare or fusee of cylindrical or stick form 60, is placed in the head end 32 of the cylinder within a combustion chamber 61 formed therein. Just prior to its placement, the fusee cap is removed from the fusee, after which it is inserted in the firing chamber 61 with its igniter end up, and its lower end resting within a cup shaped recess 62 in the upper end of the piston 40, the wall 63 of the cup flaring in an upward and outward direction.

The fusee 60 is ignited by a blank cartridge 64, which is contained within a gun barrel 65 inserted within the upper end of the cylinder head 32. Leakage between the barrel 65 and head is prevented by a suitable side seal 66 on the barrel engaging the wall of the head. The barrel is threaded into a gun body 67 which is threadedly secured to the upper end of the cylinder head 32. This body 67 also contains a breech block or cap 68 threaded on to the upper end of the barrel 65 and having an inwardly directed flange 69 firmly engaging a thin metallic disc 70 bearing against the cap 71 of the cartridge (see Figs. 5 and 6). In effect, the breech block 68 clamps the disk 70 and cartridge cap 71 to the gun barrel 65, leakage in an upward direction from the barrel being prevented by a suitable gasket 72 in the barrel bearing against the thin disc 70.

The cartridge 64 is fired by a pin 73 whose tapered end 73a can enter a tapered hole 74 in the breech block to strike and indent the disc 70, and thereby fire the cartridge. The flame from the cartridge ignites the upper end of the fusee 60 and initiates its combustion, which then becomes self-sustaining.

Figure 2A:
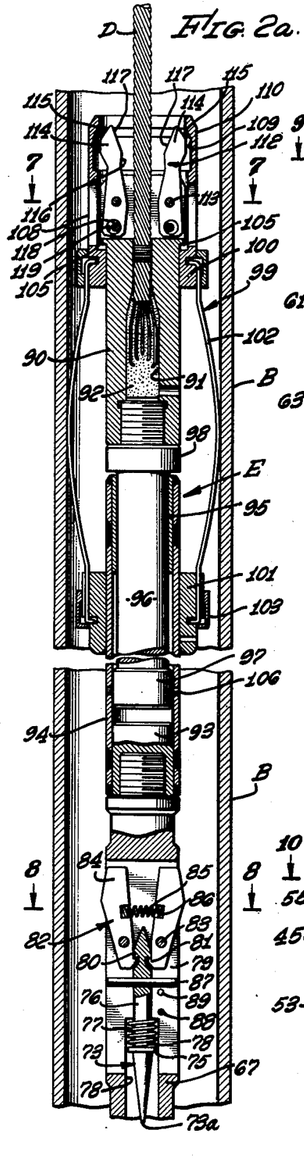
Figure 2B:
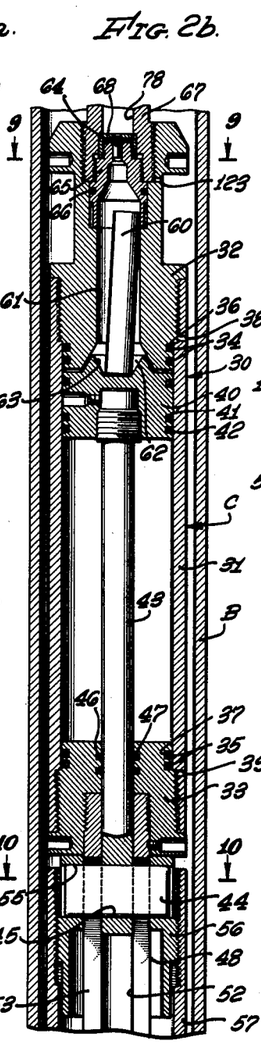
Figure 2C:
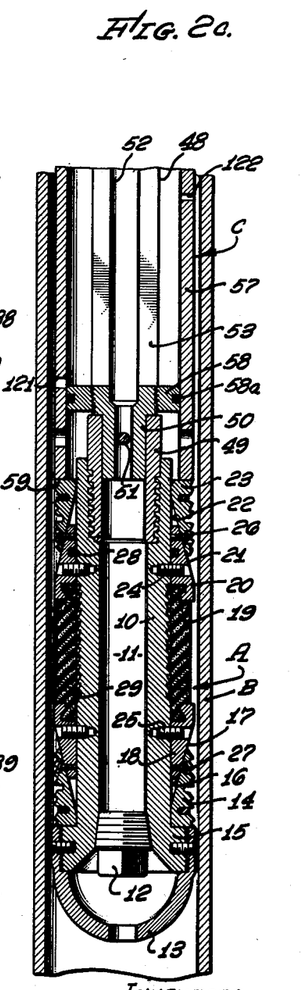
Figure 3A:
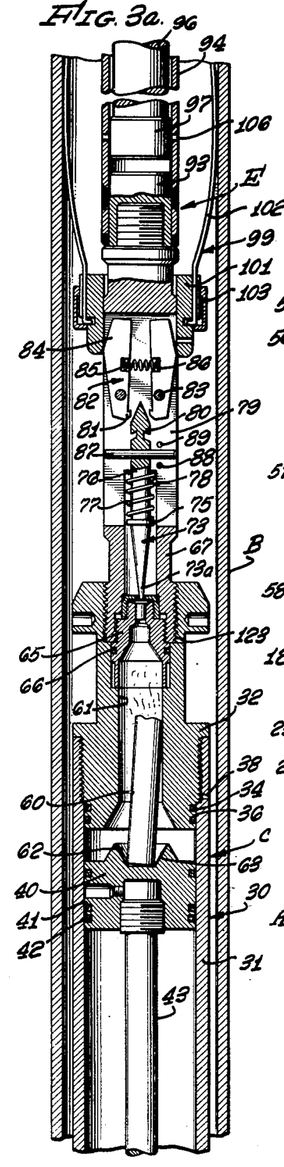
Figures 3B, 8, 9, 10:
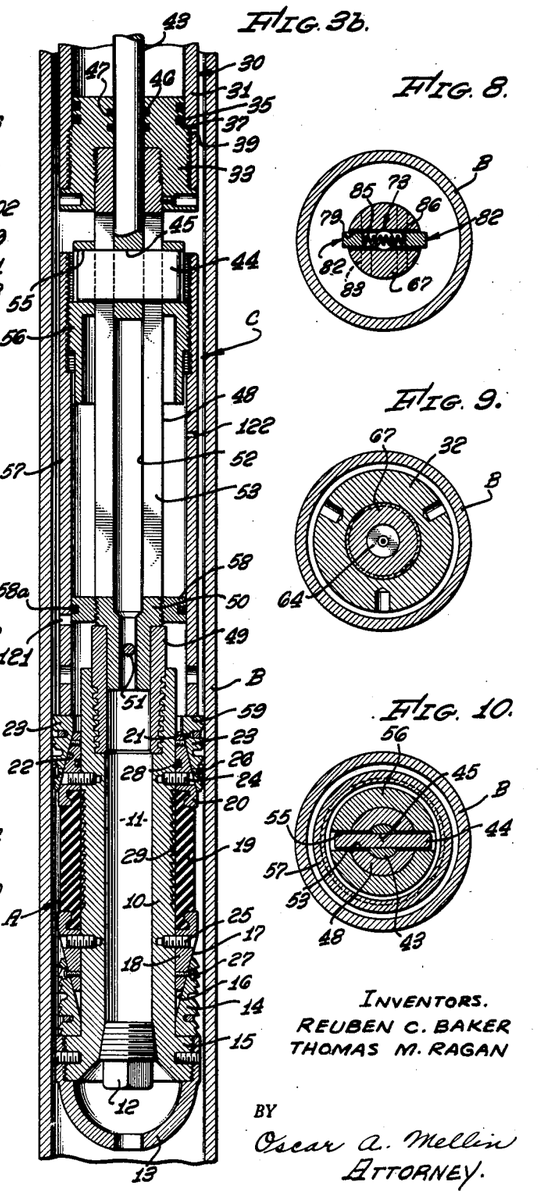

As best seen in Figs. 2a and 3a, the tapered lower end 73a of the firing pin 73 extends downwardly from a flange or spring seat 75 integral with the firing pin shaft 76, all of these elements being disposed within the gun body 67. A compressed helical spring 77 is disposed between the seat 75 and the upper end of the central bore 78 through the body, this spring exerting sufficient force to shift the pin 73 downwardly and strike its end 73a against the thin disk 70, in order to fire the cartridge 64.

The shaft 76 of the pin extends upwardly through an elongate transverse slot 79 within the body 67, its upper end being formed with a pair of wings or hooks 80 adapted to be engaged by inwardly directed latch fingers 81 on the lower ends of latch levers 82 disposed in the body slot 79 and pivotally mounted on pins 83 supported in the body. The upper arms 84 of the levers are urged in an outward direction, to maintain the latch fingers 81 engaged under the firing pin hooks 80, by an expansible spring 85, whose opposite ends are received within recesses 86 in the arms 84. So long as the spring 85 holds the upper lever arms 84 outwardly and the latch fingers 81 under the firing pin hooks 80, the firing pin 73 is maintained in an elevated position above the disc 70 and cartridge 71, holding the firing spring 78 in highly compressed condition.

Figure 1A:
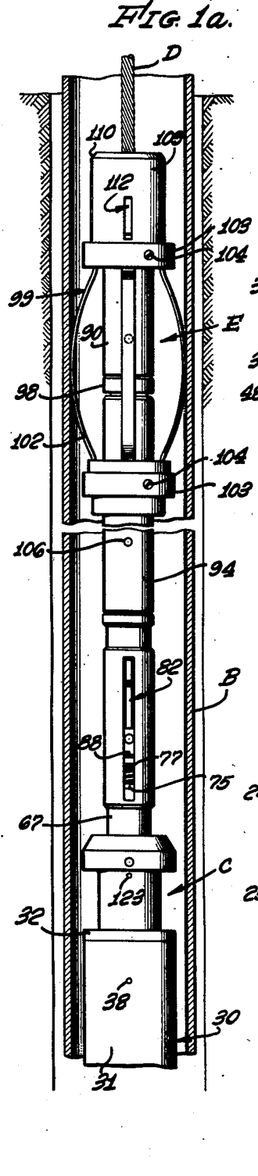
Figures 1B, 5, 6, 7:
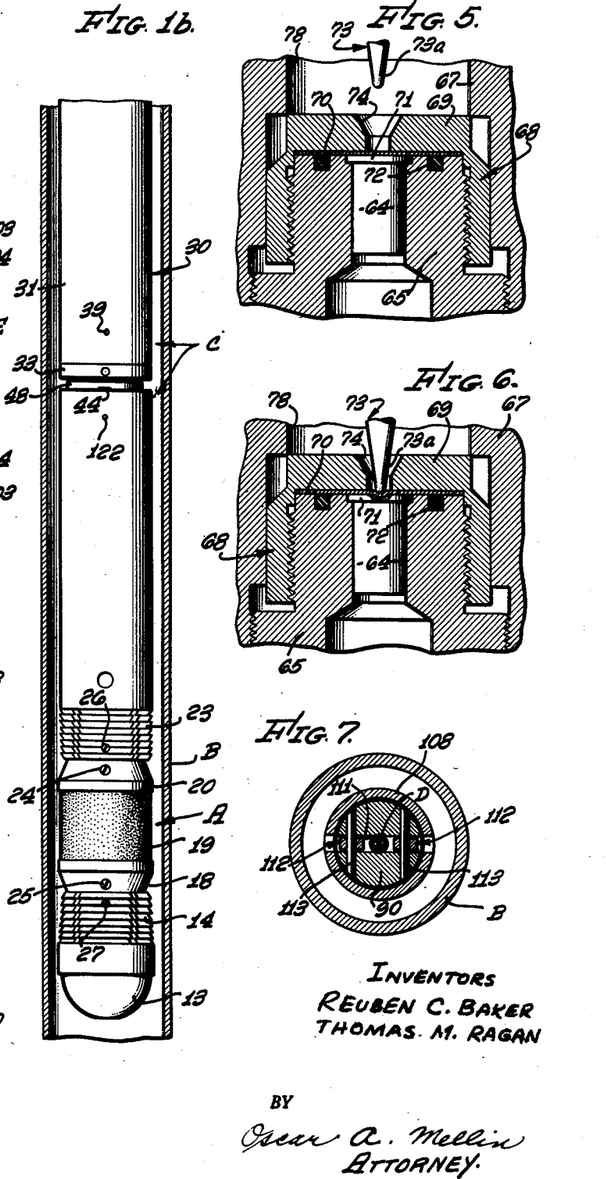

The latch lever arms 84 are movable inwardly toward each other, to swing their fingers 81 outwardly from engagement with the firing pin 73, allowing the firing spring 78 to move the point 73a of the pin downwardly and strike it against the disk 70. In the event that the point pierces the disc, rather than merely indents it (as illustrated in Fig. 6), the downward movement of the pin is limited by engagement of the transverse rod 87 extending through the pin with a stop pin 88 secured to the gun body 67 and extending into or across its slot 79. As a precautionary measure, a hole 89 is provided through the gun body 67 into its slot 79 for the insertion of a safety pin (not shown), which holds the firing pin 73 in elevated position against the force of its spring 78 during assembly of the mechanism. Should the latch levers 82 become released inadvertently during assembly, the firing pin 73 could move downwardly only to a slight extent as determined by engagement of the rod 87 with the safety pin in the hole 89. Of course, after the tool has been completely assembled and prior to its lowering in the well bore, the safety pin is removed from the hole 89 to permit unrestricted downward movement of the firing pin 73 when released.

The upper end of the gun body 67 is threaded into a sinker bar or jarring device E to provide sufficient weight for forcing the entire apparatus through the well fluid during its descent in the casing B. The upper end of the jarring device or sinker bar is secured to a wire line socket 90 having an enlarged bore 91 for the reception of the unravelled lower end of the wire line D. As is well known, the wire line may be firmly secured in the socket by filling the bore 91 of the latter with Babbitt metal 92, or any other suitable material.

As disclosed in the drawings, it is preferred to employ a jarring device E, instead of merely a sinker bar, in the event it is necessary to forcibly retrieve the apparatus from the well casing B. This jarring device includes a lower head 93 threaded on the upper end of the gun body 67. An outer barrel 94 is welded or otherwise suitably secured to its head 93, and has an upper head 95 welded or otherwise suitably secured to it. An inner mandrel 96 is disposed within the barrel 94, having a lower head 97 adapted to engage the lower barrel head 93, when in its lowermost position, and also with the upper head 95, when in its uppermost position. This mandrel 96 is threaded into the lower end of the wire line socket 90, and preferably has a flange 98 to substantially bridge the space between the socket 90 and barrel 94.

Reciprocation of the mandrel 96 by the wire line D, in a known manner, will cause its head 97 to strike one or more hammer blows against either the lower or upper barrel heads 93, 95, to provide the desired jarring action on the mechanism.

In the form of invention disclosed in Figs. 1 to 11, inclusive, the cartridge 64 is fired by mechanical instrumentalities. For the purpose of moving the latch lever arms 84 inwardly, a friction drag device 99 may be employed. This device includes upper and lower collars 100, 101 slideable along the wire line socket 90, jarring mechanism E and gun body 67. The upper and lower ends of outwardly bowed drag springs 102 are suitably secured to these collars, as by the use of encompassing rings 103 and screws 104.

The springs 102 frictionally engage the wall of the well casing B, which tends to resist its movement therewithin. Nevertheless, the drag device 99 is forced through the well casing, during lowering movement of the apparatus therewithin, by engagement of the upper collar 100 with a shoulder 105 on the wire line socket 90. Upward movement of the wire line, after the desired packer setting location has been reached in the well bore, moves the entire apparatus, with the exception of the drag device 99, upwardly within the casing, pulling the latch levers 82 within the lower drag collar 101 (see Fig. 3a), and causing the latter to shift the latch lever arms 84 inwardly and release the fingers 81 from the firing pin 73, whereupon the spring 78 is free to strike the pin end 73a against the disk 70 and fire the cartridge 64.

Actually, the entire apparatus is lowered in the well casing to a point below the desired setting location of the bridge plug in the casing B. This distance below the desired location is the relative distance that the lower drag collar 101 must travel along the jarring device E and body 67 to release the latch levers 82 from the firing pin 73. Accordingly, subsequent elevation of the wire line D by this distance will pull the levers 82 within the drag collar 101, to release the pin 73, fire the cartridge 64 and ignite the fusee 60. Assurance is thus obtained of setting the packer A at the intended point in the well casing B.

In order to prevent the drag collars 100, 101 from catching or hanging up on the jarring device E, the latter is purposely maintained in its fully contracted position, with the mandrel head 97 adjacent the lower barrel head 93, so that a substantial gap does not exist between the upper end of the barrel 94 and the flange 98, in which the drag collars might catch. Maintenance of the mandrel in the barrel in this desired position is secured by a shear pin 106 extending through the mandrel head 97 into the outer barrel 94 (see Figs. 2a and 3a). If the jarring mechanism is to be operated, a pull taken on the wire line D of sufficient force will shear the pin 106. But at that time, the drag device E has already performed its function of releasing the latch levers 82, and it is immaterial whether it subsequently catches or hangs up on the jarring mechanism.

Figures 12, 13, 14, 15, 16:
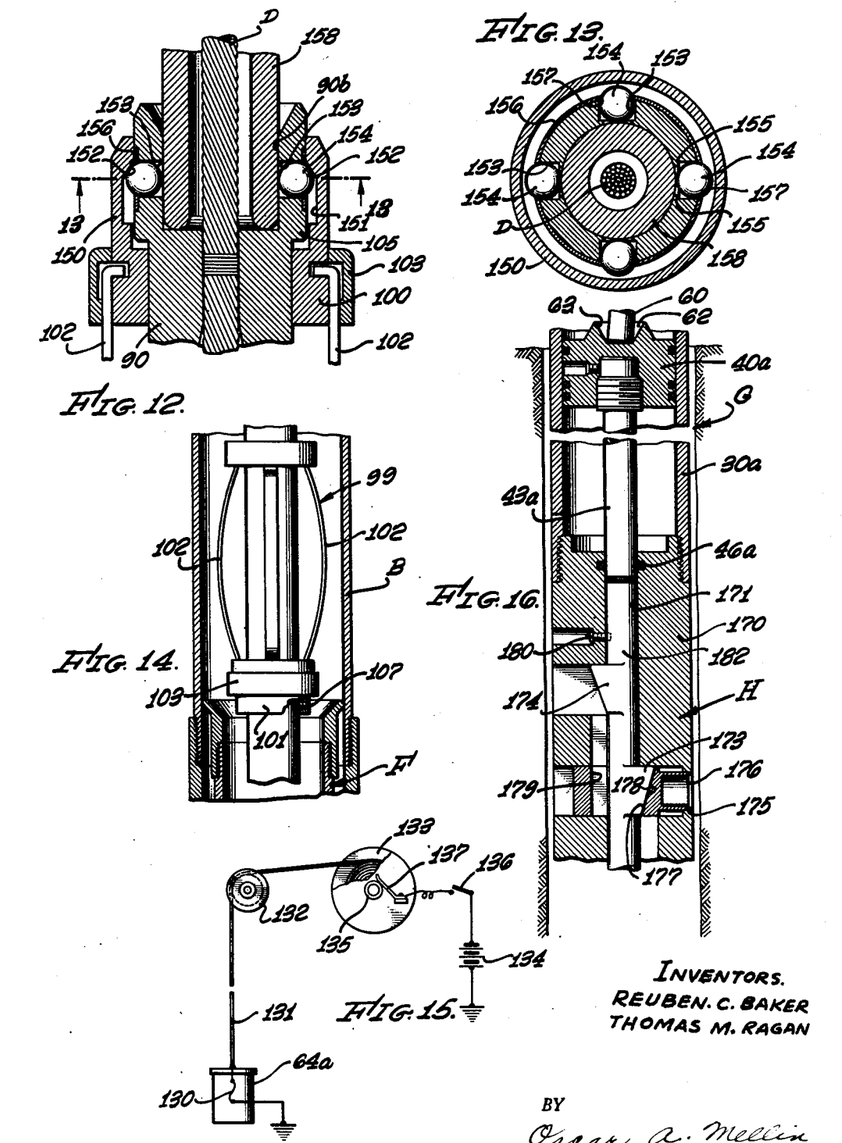
Fig. 12 is a view similar to Fig. 11 of a modified form of latch device.
Fig. 13 is a cross-section taken along the line 13—13 on Fig. 12.
Fig. 14 is an elevation of the drag device as mounted on the apparatus when the latter is to be used in a liner.
Fig. 15 is a diagrammatical view of an electric arrangement for firing the cartridge, which initiates combustion in the apparatus.
Fig. 16 is a partial longitudinal section through another form of the invention.

In some well bores, a bridge plug is to be set within a liner having a substantially smaller diameter than the casing on which it is suspended. In lowering the apparatus described through the casing, the springs 102 in the drag device 99 may not frictionally engage the casing B, to maintain the drag device in its uppermost position on the socket 90 and jarring mechanism E. This device 99 may drop downwardly into engagement with the latch levers 82 and inadvertently and prematurely effect their release. This contingency is guarded against by securing the drag device 99 to the barrel 94 or the socket 90. For example, as shown in Fig. 14, a shear pin 107 may be disposed in the lower collar 101 and threaded into the outer barrel 94. When so attached, the drag springs 102 assume their unrestrained outwardly bowed condition. Upon entering a liner F of less diameter than the unrestrained diameter of the body springs 102, the latter are pressed inwardly, which exerts a downward force on the lower collar 101 of sufficient value to shear the screw 107, and thus free the drag device 99 for the performance of its function of releasing the latch levers. The friction of the springs 102 against the wall of the liner F insures the upper location of the drag device with its upper collar 100 engaging the flange 105.

As explained above, upward movement of the wire line D effects setting of the well packer A in the well bore. Under some circumstances, it is desired to remove the apparatus from the well casing after it has been lowered therewithin without setting the packer. To prevent such upward removal from setting the packer, the drag device 99 can be locked in its upper position by a mechanism now to be described (see Figs. 2a and 11).

The upper drag collar 100 has an upwardly extending sleeve 108 provided with an inner circular groove or recess 109 having an upward and inwardly tapering shoulder 110. The wire line socket 90 is provided with a transverse slot 111 in which a pair of opposed latch levers 112 are pivotally mounted on pins 113. These levers have upwardly extending fingers 114 formed with outer tapered portions 115 companion to and engageable with the tapered sleeve shoulder 110, and also with inner surfaces 116 which are positioned substantially parallel to the axis of the wire line D when the fingers 114 engage the shoulder 110. The fingers also have upwardly and outwardly tapered guiding surfaces 117 extending between the parallel surfaces 116 and their upper ends.

Inward and outward movements of the latch levers 112 are limited by stop pins 118 in the socket body 90 extending through enlarged holes 119 in the levers.

Should it be desired to remove the apparatus from the well casing B after it has been lowered therewithin, without setting the plug A, the latch fingers 114 are locked within the sleeve recess 109. It is to be noted that during lowering of the apparatus in the casing, the upper drag collar 100 is in its uppermost position with its recess 109 opposite the latch fingers 114. Accordingly, a go-devil 120 may be dropped over the wire line D (see Fig. 11) and will engage the tapered surfaces 117 on the fingers, forcing the latter outwardly into the recess 109 in the drag collar sleeve 108. The go-devil will ride off the surfaces 117 and be disposed within the parallel latch finger surfaces 116, acting as a positive stop against inward movement of the latches 112 from the collar recess 109.

Upward movement of the wire line D will then also produce corresponding upward movement of the drag device 99, since the latter is coupled to the wire line socket 90 through the latch fingers 114 and their engagement with the shoulder 110. Accordingly, relative downward movement of the drag device 99 along the socket 90 and jarring mechanism E is prevented, which precludes undesired firing of the cartridge 64 and ignition of the combustible charge 60.

It is to be noted that the latch device 112 does not prevent normal operation of the apparatus, since upward movement of the wire line D, in the absence of the go-devil 120, will merely cause the tapered ends 115 of the latch fingers to be forced inwardly by the tapered shoulder 110 out of the sleeve recess 109. In other words, the fingers 114 are ineffective to perform their latching function unless the go-devil 120 is dropped into engagement with them.

A modified form of latch device is illustrated in Figs. 12 and 13. In general, this device operates in the same manner as the other lock mechanism.

The modified device also includes a sleeve 150 extending upwardly from the upper drag collar 100, and having a recess 151 terminating in an upwardly and inwardly inclined shoulder 152. The wire line socket 90 has a plurality of generally radial holes 153 extending laterally therethrough, each of these holes receiving a ball detent or lock 154. Inward movement of each ball 154 is limited by its engagement with a pair of oppositely disposed shoulders 155 extending inwardly toward each other from the sides of the hole 153. Outward movement of the balls is limited by their engagement with a retainer sleeve 156 encompassing the upper portion of the wire line socket 90 in the region of the holes 153. The balls may extend outwardly through opening 157 in the sleeve 156.

When the upper drag collar 100 is in engagement with the socket shoulder 105, its recess 151 is disposed in transverse alignment with the holes 153. In this position, the balls 154 can project outwardly through the retainer sleeve openings 157 to an extent insuring their disposition in the recess 151 and subsequent engagement with the tapering shoulder 152. Similarly, the balls 154 may occupy an inward position slightly within the central bore 90b of the socket 90 and completely within the confines of the retainer sleeve 156.

In the event the latch device need not be used in withdrawing the apparatus, an upward pull on the wire line D will merely cause the balls to ride up the tapered shoulder 152 and inwardly of the holes 153, the balls being incapable of locking the upper drag collar 100 to the wire line socket 90. However, in the event it is desired to prevent operation of the apparatus, a go-devil 158 is dropped down the wire line D into engagement with the balls 154, pushing them outwardly into the recess 151 in the sleeve portion of the upper drag collar (see Fig. 12).

The go-devil 158 will slide readily along the balls 154 and come to rest on the socket 90, with the periphery of the go-devil preventing inward retracting movement of the balls (as seen from Fig. 12.) Accordingly, upward movement of the wire line D will also move the upward drag collar 100 with it, since the balls 154 are held by the go-devil 158 in engagement with the tapered shoulder 152, enabling the entire apparatus to be withdrawn from the well bore without being actuated.

As aforenoted, the upper end of the fusee 60 is ignited through firing of the cartridge 64, burning away of the fusee proceeding in a downward direction. Should the fusee remain in its upright substantially vertical position, such as disclosed in Fig. 2b, there is a possibility that burning would take place down along the sides of the fusee, producing channels therewithin. As a result, sufficient gas pressure might not be developed in the cylinder 30. By providing the flaring cup-shaped recess 62 in the piston 40, the downward movement of the piston in the cylinder permits the fusee 60 to move out of the relatively small diameter firing chamber 61 and rest against the side of the cylinder sleeve 31 (see Fig. 4a). As a result of this position, the entire fusee is more readily ignited and will be consumed, insuring generation of a maximum gaseous pressure.

In running the tool through the drilling mud or other liquid in the well casing, the hydrostatic head of the well fluid tends to counteract or offset the gaseous pressure developed in the cylinder 30. This offsetting force is held to a minimum by providing the seals 46 between the lower cylinder head 33 and piston rod 43. Thus, the hydrostatic head of fluid can act only in an upward direction upon the cross-sectional area of the piston rod. At the outset, the space between the piston 40 and lower cylinder head 33 is filled with air at atmospheric pressure. Of course, this air is compressed somewhat during downward movement of the piston 40, but the extent of compression is small, when compared with the relatively high pressures that can be developed in the cylinder (of the order of 1000 p. s. i., 2000 p. s. i., 3000 p. s. i., and much higher).

The gas pressure developed in the upper end of the cylinder 30 is acting over a relatively large piston area, while the offsetting hydrostatic head of fluid is acting over only a comparatively small piston rod area. Accordingly, the pressure in the cylinder required to offset the hydrostatic head is only a small fraction of the hydrostatic head pressure.

The expansion rate of the gases developed in the cylinder 30 may be retarded to insure a sufficient lapse of time in obtaining the desired sequence of operations on the well packer A, or other well tool that might be secured to the setting or operating device C. A dash pot is provided within the setting sleeve or skirt 57 (see Figs. 2c, 3b, 4b). The rate at which the well fluid can be discharged from the sleeve 57 is retarded, during movement of the setting ring 56 toward the dash pot head 58 attached to the lower end of the actuating mandrel 48. When in their initial positions, the head 58 is disposed below a relatively large size hole 121, which permits the well fluid to flow into the setting sleeve 57, completely filling it, forcing the air through a relatively small size bleeder hole 122 through the setting sleeve 57 adjacent the setting ring 56 (see Fig. 2c). This air can also escape through the working clearance spaces provided between the setting ring 56 and mandrel 48, and also between the anvil 44 and sides of the mandrel slots 53.

As the piston 40 moves downwardly, the setting sleeve 57 is also moved downwardly along the dash pot head 58, the large hole passing below the packing ring 58a on the head and causing all of the well liquid in the setting sleeve to be forced out through the small bleeder hole 122 and the aforenoted clearance spaces (see Figs. 3b and 4b). This hole 122 and the spaces are of relatively small area, and restrict the passage of the well fluid from the setting sleeve 57. In this manner, a dash pot effect is provided, which increases the time interval during which the parts are movable. In effect, it retards the movement of the piston 40 in the cylinder 30 and the expansion rate of the gaseous products of combustion.

The products of combustion are trapped within the cylinder 30 and will remain therewithin until the tool is dismantled. Venting of these combustion products is provided for prior to full dismantling of the parts, to insure the absence of any pressure forces that would tend to forcibly separate the parts, with probable injury to persons and property. It is to be noted that the upper cylinder head 32 has a pressure relief hole 123 extending through it immediately below the end of the gun body 67. This hole is displaced from the packing ring 66 on the gun barrel 65, a substantially lesser longitudinal distance than the threaded engagement between the gun body 67 and upper head 32. Because of this relative arrangement of parts, unthreading of the body 67 from the head 32 will dispose the seal ring 66 out of the chamber 61 before the body is fully disconnected from the head, allowing prior escape of the gases through the pressure release hole 123.

Further venting is also provided by the holes 38, 39 at the upper and lower ends of the cylinder sleeve 31. Here again, the length of threaded interconnection between the heads 32, 33 and skirt 31 is greater than the distance of the seals 34, 35 from the vent holes 38, 39. Should either of these heads 32, 33 be unthreaded from the skirt 31 prior to detachment of the gun body 67 from the firing head 32, the corresponding seals 34 or 35 would be moved out of sealing engagement with the skirt 31 prior to disconnection of either head from the skirt, communicating the corresponding vent hole 38 or 39 with the interior of the cylinder 32 and allowing the gases or compressed air to escape therethrough.

Full operation of the apparatus in the well casing will now be described. The equipment is assembled on the lower end of the wire or other flexible line D, with the parts in the relative positions shown in Figs. 2a to 2c, inclusive. The tool is lowered through the well casing B to a point a little below the location at which the packer A is to be anchored to the casing. The wire line D is then pulled upwardly, which moves the drag device 99 relatively in a downward direction until its lower collar 101 is disposed over and against the upper latch lever arms 84, forcing them inwardly and releasing the latch fingers 81 from the firing pin 73. The spring 78 then shifts the firing pin 73 rapidly downward, to engage its point 73a with the thin disc 70, striking the disc and cartridge head 71 with sufficient force to fire the cartridge 64 (see Figs 3a, 5 and 6). The flame emanating from the cartridge ignites the charge of black powder, or other equivalent igniting substance, at the upper end of the combustible charge or fusee 60, which begins burning away in a downward direction.

The gases or products of combustion gradually build up pressure in the firing chamber 61 and cylinder 30, urging the piston 40 downwardly and the cylinder 30 upwardly. The force of the piston 40 is transmitted through the rod 43, cross-piece 44 and setting ring 56 to the sleeve 57, which bears against the upper slips 23. When sufficient pressure has been developed in the cylinder to overcome the shear strength of the screws 26, and also the hydrostatic head of fluid acting upwardly on the piston rod 43, the slips 23 are released from the expander 20 and are pushed downwardly along the latter cone into outward engagement with the casing B. Of course, during such downward movement, the piston 40 and piston rod 43 move down within the cylinder 30 to a pronounced extent, which may momentarily decrease the unit pressure in the cylinder (see Figs. 3a and 3b).

As the combustible charge 60 continues to burn the gas pressure within the cylinder 30 increases to a further extent. Since the upper slips 23 are wedged against the casing B, the piston cannot move downwardly to any further appreciable extent. Instead, the cylinder 30, actuating mandrel 48, sleeve 49 and packer body 10 are urged in an upward direction. When the pressure or force in the cylinder has increased sufficiently to overcome the shear strength of the screws 24 holding the upper expander 20 to the body, such screws are disrupted and the packer body 10 is moved upwardly within the upper expander 20 to compress the packing sleeve 19 between the upper and lower expanders 20, 18 and force it into firm sealing engagement with the casing wall.

As the cylinder gas pressure increases further, as a result of the continued combustion of the charge 60, the shear values of the screws 25, 27 attaching the lower expander 18 to the body 10 and the lower slips 14 to the lower expander are exceeded, and these shear screws are disrupted, allowing the cylinder 30 to move upwardly and carry the body 10 and lower slips 14 in an upward direction, to shift the latter radially outward into engagement with the casing B (see Figs. 4a and 4b).

The pressure in the cylinder continues to increase, as combustion of the charge proceeds, and all of the packer elements are engaged more firmly with the casing B. When the pressure exceeds the shear strength of the pin 51 securing the lower end 50 of the actuating mandrel 48 to the sleeve 49, this pin is sheared to release automatically the setting tool C from the well packer A. All of the mechanism, with the exception of the packer may now be removed from the well casing B.

In the event of failure of the main shear pin 51 to release, or in the event of any other unforeseen occurrence tending to hold the setting tool C in the well casing, the jarring mechanism E is actuated through proper reciprocation and hammering of the inner mandrel 96 upon the barrel heads 93, 95, until sufficient force has been exerted to shear the pin 51, or overcome the holding force of whatever restriction is present in the well casing.

Although the mechanism heretofore described provides for the mechanical firing of the cartridge 64 to ignite the combustible charge 60, the charge may be ignited by other means. As disclosed in Fig. 15, the cartridge 64a may include a heating filament 130 connected in an electrical circuit, which includes a conductive wire line cable 131 extending to the top of the well bore and running over a suitable sheave 132 on to a winding drum 133. A suitable source of current 134 is connected to ground at one end, with its other end connected to a slip ring 135 on the drum through a suitable switch 136 and slip contact 137. The slip ring 135 is suitably connected to the insulated conductor in the cable 131, the circuit being completed by connecting the filament 130 to ground.

Upon closing the switch 136 at the top of the well bore, current passes through the filament 130 for the purpose of firing the cartridge 64a and igniting the fusee 60.

The setting device described may be used in connection with other subsurface well tools, especially those in which the operational functions in the well bore should occur over a relatively long interval of time, when compared with the instantaneous application of force associated with an explosive. By relatively long interval of time is meant a period of one or more seconds. As an example, the well packer disclosed can be fully set by the use of the railroad flare in from 8 to 12 seconds, with sufficient time elapsing between the definite operational steps to insure their proper occurrence. The dash pot may increase this time to 16 to 20 seconds. Of course, extended periods over which the charge may develop the maximum desired pressures would also operate properly, although too long a time is obviously uneconomical. By an extended period is means as much as 20 minutes, one hour, three hours or longer. In general, as used herein, a slow burning combustible product is one that requires at least one second to develop its maximum pressure, as distinguished from the small fraction of a second which an explosive requires.

In Fig. 16, a setting tool G embodying the relatively slow burning fuel 60 is attached to a side wall sampling tool H. The cylinder 30a of the setting tool may be threadedly connected to the upper end of sampler body 170, with the piston rod 43a extending through rod packing 46a into a central bore 171 in the body. The piston rod is engageable with an actuator in the form of a rod 182 in the central bore having a pair of opposed and oppositely inclined cams 173, 174 extending laterally therefrom. These cams are adapted to move through a slide 175 guided for transverse movement in the body and having a sampling tube 176 at its outer end. The guide is also provided with a downwardly and inwardly tapered surface 177 engageable with a companion surface 178 on the lower actuator cam 173. The upper cam 174 is engageable with the rear portion 179 of the slide.

Initially, before the combustible charge 60 is ignited, the piston 40a is in its uppermost position within the cylinder 30a and the lower cam element is disposed within the sampler slide 175. The parts are held in this position by a shear screw 180 threaded into the body 170 and rod 182. When the combustible charge is ignited, the pressure developed in the cylinder 30a moves the piston 40a downwardly to shear the screw 180 and shift the actuating cam 173 down through the slide 175 and along its tapered face 177, forcing the sampling tube 176 outwardly into the wall of the surrounding formation, in order to extract a sample therefrom. Continued downward movement of the piston 40a moves the actuator 182 downwardly to shift the actuator cam 173 completely through the slide 175 and engages the retracting cam 174 with the rear slide portion 179, withdrawing the slide 175 back into the confines of the body 170, with the aforementioned sample retained in the tube 176.

The apparatus may now be elevated to the top of the well bore and the sample extracted from the tube 176 for examination.

Of course, a plurality of sampling tubes and sets of actuating and retracting cams can be mounted in a single body 170, in order to obtain a plurality of samples from the formation wall.

The device for retarding expansion of the gas developed in the cylinder is both described and claimed in the divisional application of John R. Baker, Serial No. 220,661, filed April 12, 1951, for "Subsurface Well Apparatus with Gas Expansion Retarding Device." The invention relating to the gun firing portion of the apparatus is both described and claimed in the divisional application of Thomas M. Ragan, Serial No. 220,657, filed April 12, 1951, for "Subsurface Gun Firing Apparatus." The invention relating to the prevention of the drag device from firing the gun apparatus is both described and claimed in the divisional application of Martin B. Conrad, Serial No. 220,646, filed April 12, 1951, for "Apparatus for Preventing Operation of Subsurface Well Tools." The invention relating to the jarring and drag devices is both described and claimed in the divisional application of Reuben C. Baker, Serial No. 220,699, filed April 12, 1951, for "Well Tool Operating and Jarring Apparatus." The invention relating to the feature of venting gaseous fluids from the cylinder is both described and claimed in the divisional application of Reuben C. Baker, Serial No. 278,181, filed March 24, 1952, for "Gas Operated Well Apparatus."

The inventors claim:

1. In well apparatus: a well device adapted to be operated in a well bore; fluid actuated means, including a closed chamber, for operating said well device; a slow burning, gas producing combustible product in said closed chamber capable of burning away progressively to generate a gas whose pressure increases gradually within said closed chamber to actuate said fluid actuated means while said pressure is increasing, said product requiring at least one second to develop maximum pressure in said closed chamber; and means for initiating combustion of said product.

2. In well apparatus: a well device adapted to be operated in a well bore; fluid actuated means, including a closed chamber, for operating said well device; a slow burning, gas producing combustible product containing its own source of oxygen disposed in said closed chamber, said product being capable of burning away progressively to generate a gas whose pressure increases gradually within said closed chamber to actuate said fluid actuated means while said pressure is increasing, said product requiring at least one second to develop maximum pressure in said closed chamber; and means for initiating combustion of said product.

3. In well apparatus: a well device adapted to be operated in a well bore; fluid actuated means, including a closed chamber, operatively connected to said well device; a slow burning, gas producing combustible product in said closed chamber capable of burning away progressively to generate a gas whose pressure increases gradually within said closed chamber to actuate said fluid actuated means while said pressure is increasing, said product requiring at least one second to develop maximum pressure in said closed chamber; and means for igniting said product.

4. In well apparatus: a well device adapted to be operated in a well bore; fluid actuated means, including a closed chamber, for operating said well device; an elongate, solid slow burning, gas producing combustible product in said closed chamber capable of burning away progressively to generate a gas whose pressure increases gradually within said closed chamber to actuate said fluid actuated means while said pressure is increasing, said product requiring at least one second to develop maximum pressure in said closed chamber; and means for initiating combustion of said product at one of its ends.

5. In well apparatus: a well device adapted to be operated in a well bore; fluid actuated means, including a closed chamber, for operating said well device; an elongate, solid slow burning, gas producing combustible product containing its own source of oxygen disposed in said closed chamber and capable of burning away progressively to generate a gas whose pressure increases gradually within said closed chamber to actuate said fluid actuated means while said pressure is increasing, said product requiring at least one second to develop maximum pressure in said closed chamber; and means for initiating combustion of said product at one of its ends.

6. In well apparatus: a well device adapted to be operated in a well bore; fluid actuated means for operating said well device, comprising a cylinder and a piston slidable in said cylinder; a slow burning, gas producing combustible product in said cylinder capable of burning away progressively to generate a gas whose pressure increases gradually within said cylinder to move said piston relatively in said cylinder while said pressure is increasing, said product requiring at least one second to develop maximum pressure in said closed chamber; and means for initiating combustion of said product.

7. In well apparatus: a well device adapted to be operated in a well bore; fluid actuated means for operating said well device, comprising a cylinder and a piston slidable in said cylinder; a slow burning, gas producing combustible stick in said cylinder capable of burning away progressively to generate a gas whose pressure increases gradually within said closed chamber to move said piston relatively within said cylinder while said pressure is increasing, said stick requiring at least one second to develop maximum pressure in said chamber; and means for igniting one end of said stick.

8. In well apparatus: a well device adapted to be operated in a well bore; fluid actuated means, including a closed chamber, operatively connected to said well device; a slow burning, gas producing combustible product in said closed chamber capable of burning away progressively to generate a gas whose pressure increases gradually within said closed chamber to actuate said fluid actuated means while said pressure is increasing, said product requiring at least one second to develop maximum pressure in said chamber; and explosive means for initiating combustion of said product.

9. In well apparatus: a well device adapted to be operated in a well bore; fluid actuated means, including a closed chamber, operatively connected to said well device; a slow burning, gas producing combustible product in said closed chamber containing its own source of oxygen and capable of burning away progressively to generate a gas whose pressure increases gradually within said closed chamber to actuate said fluid actuated means while said pressure is increasing, said product requiring at least one second to develop maximum pressure in said closed chamber; explosive means for initiating combustion of said product; and means for firing said explosive means.

10. In well apparatus: a well device adapted to be operated in a well bore; fluid actuated means operatively connected to said well device, comprising a cylinder and a piston slidable in said cylinder; a slow burning, gas producing combustible product in said cylinder containing its own source of oxygen and capable of burning away progressively to generate a gas whose pressure increases gradually within said cylinder to move said piston relatively in said cylinder while said pressure is increasing, said product requiring at least one second to develop maximum pressure in said cylinder; explosive means in said cylinder above said product to initiate combustion of said product; and means for firing said explosive means.

11. In well apparatus: a well device adapted to be operated in a well bore; fluid actuated means operatively connected to said well device, comprising a cylinder, a piston slidable in said cylinder, a piston rod secured to said piston and extending from said cylinder, and packing means between said rod and cylinder; a slow burning, gas producing combustible product in said cylinder containing its own source of oxygen and capable of burning away progressively to generate a gas whose pressure increases gradually within said closed chamber to effect movement of said piston relatively in said cylinder while said pressure is increasing, said product requiring at least one second to develop maximum pressure in said cylinder; and explosive means in said cylinder for initiating combustion of said product.

12. In well apparatus: a well packer having slips and packing means engageable with a well casing; fluid actuated means, including a closed chamber, operatively connected to said packer for expanding said slips and packing means against the casing; a slow burning, gas producing combustible product in said closed chamber capable of burning away progressively to generate a gas whose pressure increases gradually within said closed chamber to actuate said fluid actuated means while said pressure is increasing, said product requiring at least one second to develop maximum pressure in said closed chamber; and means for initiating combustion of said product.

13. In well apparatus: a well tool having normally retracted means engageable with a well casing; fluid actuated means, including a closed chamber, operatively connected to said tool for expanding said normally retracted means against said casing; a slow burning, gas producing combustible product in said closed chamber capable of burning away progressively to generate a gas whose pressure increases gradually within said closed chamber to actuate said fluid actuated means while said pressure is increasing, said product requiring at least one second to develop maximum pressure in said closed chamber; and means for initiating combustion of said product.

14. In well apparatus: a well device adapted to be operated in a well bore; fluid actuated means for operating said well device, comprising a cylinder and a piston slidable in said cylinder, said piston having a recess; a slow burning, gas producing combustible stick in said cylinder resting on said piston within said recess and capable of burning away progressively to generate a gas whose pressure increases gradually within said cylinder to move said piston relatively in said cylinder while said pressure is increasing, said stick requiring at least one second to develop maximum pressure in said closed chamber; and means for initiating combustion of said stick.

15. In well apparatus: a well device adapted to be operated in a well bore; fluid actuated means for operating said well device, comprising a cylinder and a piston slidable in said cylinder, said cylinder bore being of reduced diameter above said piston; a slow burning, gas producing combustible stick in said bore which rests on said piston and which is capable of burning away progressively to generate a gas whose pressure increases gradually within said cylinder to move said piston relatively in said cylinder while said pressure is increasing, said stick requiring at least one second to develop maximum pressure in said closed chamber; and means in said cylinder above said stick for initiating combustion of said stick.

16. In well apparatus: a well device adapted to be operated in a well bore; fluid actuated means operatively connected to said well device, comprising a cylinder, a piston slidable in said cylinder and a piston rod secured to said piston and extending from said cylinder and connected to said well device, said piston and piston rod being in slidable fluid tight engagement with said cylinder to provide a closed fluid tight space on the low pressure side of said piston; and means in said cylinder on the high pressure side of said piston for moving said piston relatively in said cylinder.

REUBEN C. BAKER.
THOMAS M. RAGAN.

References Cited in the file of this patent

UNITED STATES PATENTS

| Number | Name | Date |
|---|---|---|
| 1,275,462 | Nickerson | Aug. 13, 1918 |
| 1,582,184 | Mims | Apr. 27, 1926 |
| 2,043,340 | Tilbury et al. | June 9, 1936 |
| 2,189,937 | Broyles | Feb. 13, 1940 |
| 2,266,382 | Quintrell et al. | Dec. 16, 1941 |
| 2,320,340 | Appton | June 1, 1943 |
| 2,338,157 | Allen | Jan. 4, 1944 |
| 2,373,006 | Baker | Apr. 3, 1945 |
| 2,436,036 | Defenbaugh | Feb. 17, 1948 |